United States Patent
Kim et al.

(10) Patent No.: US 9,614,673 B2
(45) Date of Patent: Apr. 4, 2017

(54) METHOD OF MANAGING KEYS AND ELECTRONIC DEVICE ADAPTED TO THE SAME

(71) Applicant: Samsung Electronics Co., Ltd., Suwon-si, Gyeonggi-do (KR)

(72) Inventors: Bumhan Kim, Seoul (KR); Naheasal Kim, Suwon-si (KR); Michael Pak, Seoul (KR); Kyunghee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/707,590

(22) Filed: May 8, 2015

(65) Prior Publication Data

US 2015/0326390 A1 Nov. 12, 2015

(30) Foreign Application Priority Data

May 8, 2014 (KR) .................. 10-2014-0054870

(51) Int. Cl.
*H04L 9/08* (2006.01)
*H04L 9/14* (2006.01)
*G06F 21/62* (2013.01)
*H04W 12/04* (2009.01)
*H04L 9/06* (2006.01)

(52) U.S. Cl.
CPC .......... *H04L 9/0863* (2013.01); *H04L 9/0822* (2013.01); *H04L 9/14* (2013.01); *G06F 21/6209* (2013.01); *H04L 9/0637* (2013.01); *H04L 2209/24* (2013.01); *H04L 2209/805* (2013.01); *H04W 12/04* (2013.01)

(58) Field of Classification Search
CPC ....... H04L 9/0863; H04L 9/0822; H04L 9/14; H04L 9/3242; H04L 2209/24; H04L 9/0816; H04W 12/04; G06F 21/6209
See application file for complete search history.

(56) References Cited

U.S. PATENT DOCUMENTS

| | | |
|---|---|---|
| 2003/0033537 A1* | 2/2003 | Fujimoto .............. G06F 21/123 713/193 |
| 2003/0074566 A1 | 4/2003 | Hypponen |
| 2010/0057960 A1* | 3/2010 | Renno ..................... G06F 21/79 710/110 |

(Continued)

OTHER PUBLICATIONS

Sonmez et al., "NIST Special Publication 800-132 Recommendation for Password-Based Key Derivation Part 1: Storage Applications", Dec. 2010, pp. 1-14, http://nvlpubs.nist.gov/nistpubs/Legacy/SP/nistspecialpublication800-132.pdf.*

(Continued)

*Primary Examiner* — Jung Kim
*Assistant Examiner* — Carlos M De Jesus Lassala
(74) *Attorney, Agent, or Firm* — Jefferson IP Law, LLP (57) ABSTRACT

A method of managing keys and an electronic device adapted to the method are provided. The method includes creating a first key, based on information included in a memory space of a processor, creating a second key, based on at least one item of user information, and creating a third key that was created through at least one encryption process, based on the created first key and the created second key.

20 Claims, 6 Drawing Sheets

(56) References Cited

U.S. PATENT DOCUMENTS

2010/0150352 A1* 6/2010 Mansour ............... H04L 9/003
 380/281
2015/0312228 A1* 10/2015 McLean ............ H04L 63/0457
 713/175

OTHER PUBLICATIONS

Kaliski et al., "PKCS #5: Password-Based Cryptography Specification Version 2.0", Sep. 2000, pp. 1-34 https://www.ietf.org/rfc/rfc2898.txt.*
Chen, "NIST Special Publication 800-108 Recommendation for Key Derivation Using Pseudorandom Functions", Sep. 2009, pp. 1-21, http://csrc.nist.gov/publications/nistpubs/800-108/sp800-108.pdf.*
Niap, "Protection Profile for Mobile Device Fundamentals", Oct. 2013, pp. 1-133, https://www.commoncriteriaportal.org/files/ppfiles/PP_MD_V1.0.pdf.*
Menezes et al., "Handbook of Applied Cryptography" (PDF version created on Feb. 2005) 1997, pp. 1-780.*

* cited by examiner

METHOD OF MANAGING KEYS AND ELECTRONIC DEVICE ADAPTED TO THE SAME

CROSS-REFERENCE TO RELATED APPLICATION(S)

This application claims the benefit under 35 U.S.C. §119 (a) of a Korean patent application filed on May 8, 2014 in the Korean Intellectual Property Office and assigned Serial number 10-2014-0054870, the entire disclosure of which is hereby incorporated by reference.

TECHNICAL FIELD

The present disclosure relates to electronic systems. More particularly, the present disclosure relates to a method of managing keys and an electronic device adapted to the method.

BACKGROUND

In recent years, as mobile electronic devices have been devices that are usually used in daily life, the importance of the information security function increases. Examples of the mobile electronic devices are smartphones, tablet Personal Computers (tablets), Portable Multimedia Players (PMPs), Personal Digital Assistants (PDAs), laptop PCs (laptops), wearable devices, and the like. Wearable devices are, for example, smart watches, Head-Mounted Displays (HMDs), and the like.

In order to enhance information protection functions in mobile electronic devices, Mobile Device Fundamentals for Protection Profile (MDFPP) and Common Criteria (CC) as International standards for certification were established on December 2013 to associate evaluation criteria for information protection systems that differ from each other in every country with each other and to mutually certificate the evaluation results.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of managing keys by applications or domains to comply with international standards and an electronic device adapted to the method.

In accordance with an aspect of the present disclosure, a method of managing keys of an electronic device is provided. The method includes creating a first key, based on information included in a memory space of a processor, creating a second key, based on at least one item of user information, and creating a third key that was created through at least one encryption process, based on the created first key and the created second key.

In accordance with another aspect of the present disclosure, an electronic device including a memory and a processor is provided. The processor is configured to create a first key, based on information included in the memory space, to create a second key, based on at least one item of user information, and to create a third key that was created through at least one encryption process, based on the created first key and the created second key.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms, such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD), such as electronic glasses, electronic clothes, and electronic bracelet, an electronic necklace, an electronic appcessary, an electronic tattoo, a smart watch, and the like.

According to various embodiments of the present disclosure, the electronic device may be a smart home appliance having a communication function. The smart home appliance may include at least one of a TeleVision (TV), a Digital Video Disc (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to various embodiments of the present disclosure, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass, and the like), avionics, a security device, a head unit for a vehicle, an industrial or home robot, an Automatic Teller Machine (ATM) of financial institutions, and a Point Of Sale (POS) device of shops.

According to various embodiments of the present disclosure, the electronic device may include at least one of furniture or a part of a building/structure, an electronic board, an electronic signature receiving device, a projector, and various types of measuring devices (for example, a water meter, an electricity meter, a gas meter, a radio wave meter, and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

Figure 1:
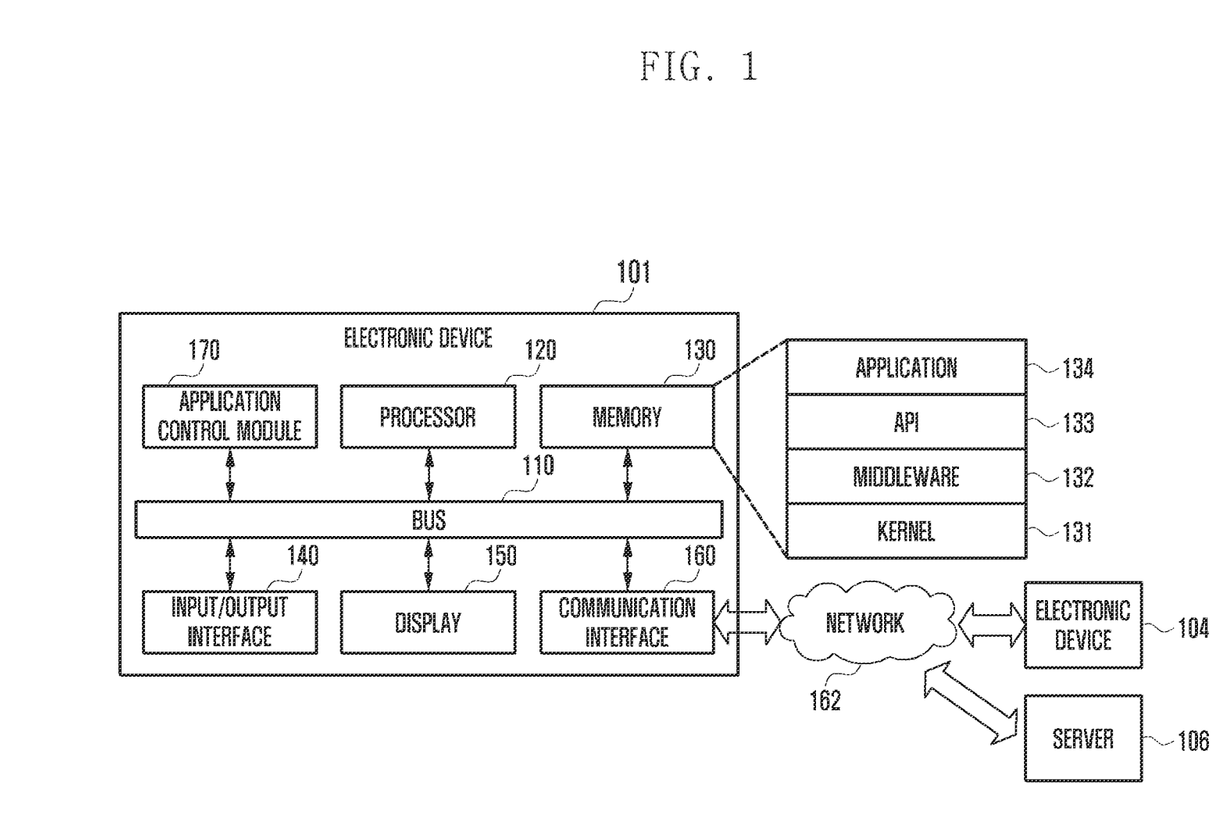
FIG. 1 illustrates a network environment including an electronic device according to an embodiment of the present disclosure.

FIG. 1 illustrates a network environment including an electronic device according to various embodiments of the present disclosure.

Referring to FIG. 1, an electronic device 101 includes a bus 110, a processor 120, a memory 130, an input/output interface 140, a display 150, a communication interface 160, and an application control module 170.

The bus 110 may be a circuit connecting the above described components and transmitting communication (for example, a control message) between the above described components.

The processor 120 receives commands from other components (for example, the memory 130, the input/output interface 140, the display 150, the communication interface 160, or the application control module 170) through the bus 110, analyzes the received commands, and executes calculation or data processing according to the analyzed commands.

The memory 130 stores commands or data received from the processor 120 or other components (for example, the input/output interface 140, the display 150, the communication interface 160, or the application control module 170) or generated by the processor 120 or other components. The memory 130 may include programming modules, for example, a kernel 131, middleware 132, an Application Programming Interface (API) 133, and an application 134. Each of the aforementioned programming modules may be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130, and the like) of the electronic device 101 can be used, to the application 134.

The API 133 is an interface by which the application 134 can control a function provided by the kernel 131 or the middleware 132 and includes, for example, at least one interface or function (for example, a command) for a file control, a window control, image processing, or a character control.

According to various embodiments of the present disclosure, the application 134 may include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 may be an application related to an information exchange between the electronic device 101 and an external electronic device (for example, an external electronic device 104). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 101 to the external electronic device (for example, the external electronic device 104). Additionally or alternatively, the notification relay application may receive notification information from, for example, the external electronic device 104 and provide the received notification information to the user. The device management application may manage (for example, install, remove, or update) at least a part of functions (for example, turning on/off the external electronic device (or some components of the external electronic device) or controlling a brightness of the display) of the external electronic device (104 communicating with the electronic device 101, an application executed in the external electronic device 104, or a service (for example, a call service or a message service) provided by the external electronic device 104.

According to various embodiments of the present disclosure, the application 134 may include an application designated according to an attribute (for example, a type of electronic device) of the external electronic device 104. For example, when the external electronic device 104 is a Motion Picture Experts Group (MPEG-1 or MPEG-2) Audio Layer 3 (MP3) player, the application 134 may include an application related to music reproduction. Similarly, when the external electronic device 104 is a mobile medical device, the application 134 may include an application related to health care. According to an embodiment of the present disclosure, the application 134 may include at least one of an application designated to the electronic device 101 and an application received from an external electronic device (for example, a server 106 or the external electronic device 104).

The input/output interface 140 transmits a command or data input from the user through an input/output device (for example, a sensor, a keyboard, or a touch screen) to the processor 120, the memory 130, the communication interface 160, or the application control module 170 through, for example, the bus 110. For example, the input/output interface 140 may provide data on a user's touch input through a touch screen to the processor 120. Further, the input/output interface 140 may output a command or data received through for example, the bus 110, from the processor 120, the memory 130, the communication interface 160, or the application control module 170 through the input/output device (for example, a speaker, a display, and the like). For example, the input/output interface 140 may output voice data processed through the processor 120 to the user through the speaker.

The display 150 displays various pieces of information (for example, multimedia data, text data, and the like) for the user.

The communication interface 160 connects communication between the electronic device 101 and the external device (for example, the external electronic device 104 or the server 106). For example, the communication interface 160 may access a network 162 through wireless or wired communication to communicate with the external device. The wireless communication includes at least one of, for example, WiFi, BlueTooth (BT), Near Field Communication (NFC), a GPS, and cellular communication (for example, Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro) or Global System for Mobile Communications (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunication network. The telecommunication network includes at least one of a computer network, Internet, Internet of things, and a telephone network. According to an embodiment of the present disclosure, a protocol (for example, transport layer protocol, data link layer protocol, or physical layer protocol) for communication between the electronic device 101 and the external device may be supported by at least one of the application 134, the API 133, the middleware 132, the kernel 131, and the communication interface 160.

According to an embodiment of the present disclosure, the server 106 supports driving of the electronic device 101 by performing at least one operation (or function) implemented by the electronic device 101. For example, the server 106 may include a communication control server module 108 that supports the application control module 170 implemented in the electronic device 101. For example, the communication control server module 108 may include at least one of the components of the application control module 170 to perform (on behalf of) at least one operations performed by the application control module 170.

Figure 2:
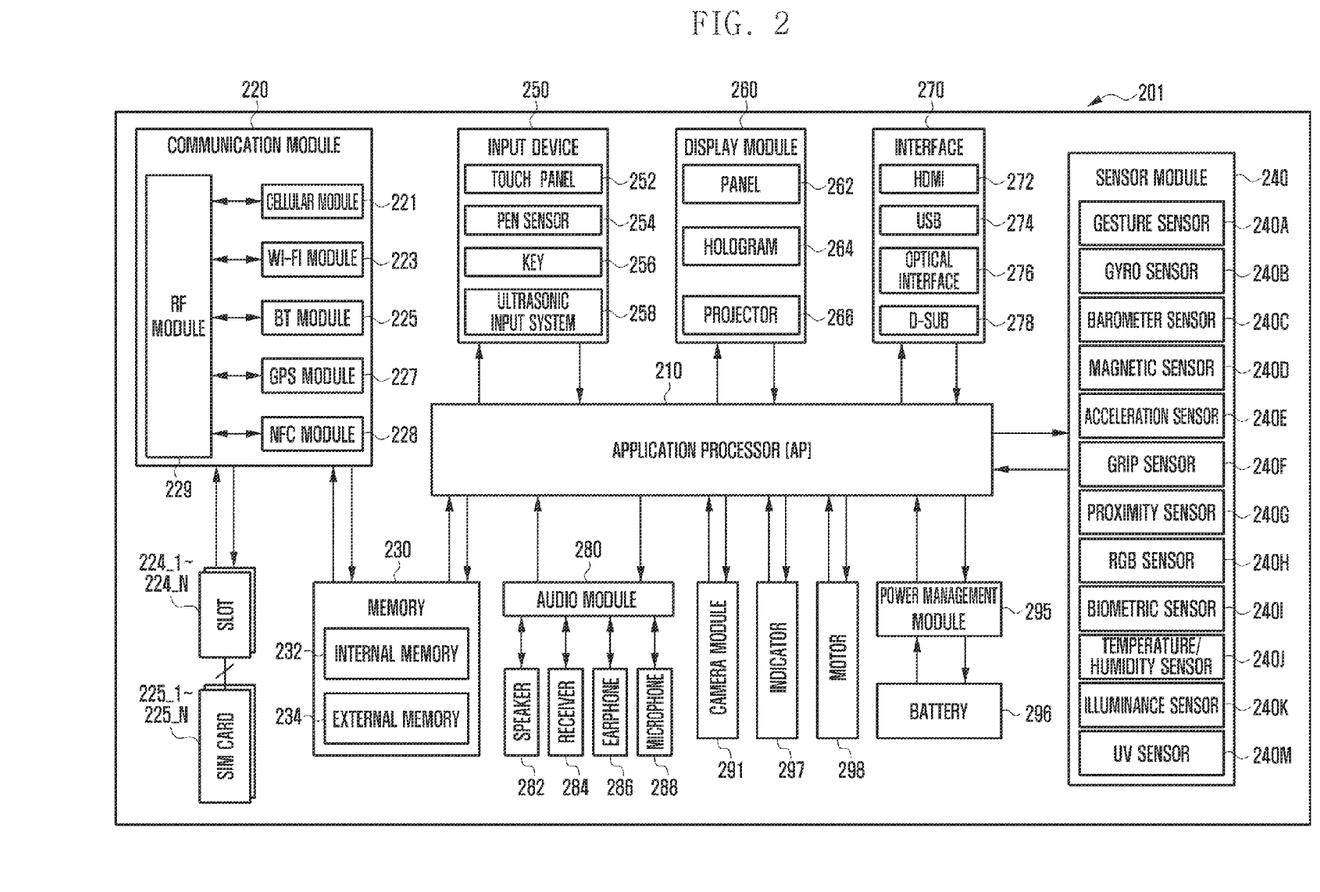
FIG. 2 illustrates a schematic block diagram of an electronic device according to an embodiment of the present disclosure.

FIG. 2 illustrates a schematic block diagram of an electronic device according to various embodiments of the present disclosure. An electronic device 201 may configure, for example, a whole or a part of the electronic device 101 illustrated in FIG. 1.

Referring to FIG. 2, the electronic device 201 includes one or more Application Processors (APs) 210, a communication module 220, Subscriber Identification Module (SIM) cards 225_1 to 225_N, a memory 230, a sensor module 240, an input device 250, a display module 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment of the present disclosure, the processor 210 may further include a Graphical Processing Unit (GPU).

The communication module 220 (for example, the communication interface 160) transmits/receives data in communication between different electronic devices (for example, the external electronic device 104 and the server 106) connected to the electronic device 201 (for example, the electronic device 101) through a network. According to an embodiment of the present disclosure, the communication module 220 includes a cellular module 221, a WiFi module 223, a BT module 225, a GPS module 227, a NFC module 228, and a Radio Frequency (RF) module 229.

The cellular module 221 provides a voice, a call, a video call, a SMS, or an Internet service through a communication network (for example, LTE, LTE-A, CDMA, WCDMA, UMTS, WiBro, GSM, and the like). Further, the cellular module 221 may distinguish and authenticate electronic devices within a communication network by using a SIM (for example, the SIM cards 225_1 to 225_N). According to an embodiment of the present disclosure, the cellular module 221 performs at least some of the functions which can be provided by the AP 210. For example, the cellular module 221 may perform at least some of the multimedia control functions.

According to an embodiment of the present disclosure, the cellular module 221 may include a Communication Processor (CP). Further, the cellular module 221 may be implemented by, for example, an SoC.

Although the components, such as the cellular module 221 (for example, a CP), the memory 230, and the power managing module 295 are illustrated as components separate from the AP 210 in FIG. 8, the AP 210 may include at least some (for example, the cellular module 221) of the aforementioned components in an embodiment.

According to an embodiment of the present disclosure, the AP 210 or the cellular module 221 (for example, a CP) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 may be included in one Integrated Chip (IC) or one IC package according to one embodiment. For example, at least some (for example, the CP corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA), and the like. Further, the RF module 229 may further include a component for transmitting/receiving electronic waves over a free air space in wireless communication, for example, a conductor, a conducting wire, and the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM cards 225_1 to 225_N are cards including a Subscriber Identification Module and may be inserted into slots 224_1 to 224_N formed in a particular portion of the electronic device. The SIM cards 225_1 to 225_N include unique identification information (for example, Integrated Circuit Card IDentifier (ICCID)) or subscriber information (for example, International Mobile Subscriber Identity (IMSI)).

The memory 230 (for example, the memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one-time programmable ROM (OTPROM), a programmable ROM (PROM), an erasable and programmable ROM (EPROM), an electrically erasable and programmable ROM (EEPROM), a mask ROM, a flash ROM, a Not And (NAND) flash memory, a Not Or (NOR) flash memory, and the like).

According to an embodiment of the present disclosure, the internal memory 232 may be a Solid State Drive (SSD). The external memory 234 may further include a flash drive, for example, a Compact Flash (CF), a Secure Digital (SD), a Micro-SD, a Mini-SD, an extreme Digital (xD), or a memory stick. The external memory 234 may be functionally connected to the electronic device 201 through various interfaces. According to an embodiment of the present disclosure, the electronic device 201 may further include a storage device (or storage medium), such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infrared (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, a microphone 288) of the electronic device 201 through an input device generating an ultrasonic signal to identify data and can perform wireless recognition. According to an embodiment of the present disclosure, the electronic device 201 receives a user input from an external device (for example, a computer or a server) connected to the electronic device 201 by using the communication module 220.

The display module 260 (for example, the display 150) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment of the present disclosure, the display module 260 may further include a control circuit for controlling the panel 262, the hologram device 264, and the projector 266.

The interface 270 includes, for example, an HDMI 272, a USB 274, an optical interface 276, and a D-subminiature (D-sub) 278. The interface 270 may be included in, for example, the communication interface 160 illustrated in FIG. 1. Additionally or alternatively, the interface 290 may include, for example, a Mobile High-definition Link (MHL) interface, a SD card/Multi-Media Card (MMC) interface, or an Infrared Data Association (IrDA) standard interface.

The audio module 280 bi-directionally converts a sound and an electronic signal. At least some components of the audio module 280 may be included in, for example, the input/output interface 140 illustrated in FIG. 1. The audio module 280 processes sound information input or output through, for example, a speaker 282, a receiver 284, an earphone 286, the microphone 288, and the like.

The camera module 291 is a device which can photograph a still image and a video. According to an embodiment of the present disclosure, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 201. Although not illustrated, the power managing module 295 may include, for example, a Power Management Integrated Circuit (PMIC), a charger IC, or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits, such as a coil loop, a resonant circuit, a rectifier, and the like, may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (for example, the AP 210) of the electronic device 201, for example, a booting status, a message status, a charging status and the like. The motor 298 converts an electrical signal to a mechanical vibration.

Although not illustrated, the electronic device 201 may include a processing unit (for example, a GPU) for supporting a module TV. The processing unit for supporting the mobile TV may process, for example, media data according to a standard of Digital Multimedia Broadcasting (DMB), Digital Video Broadcasting (DVB), media flow, and the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. In addition, some of the components of the electronic device according to various embodiments of the present disclosure may be combined to form a single entity, and thus may equivalently execute functions of the corresponding components before being combined.

Figure 3:
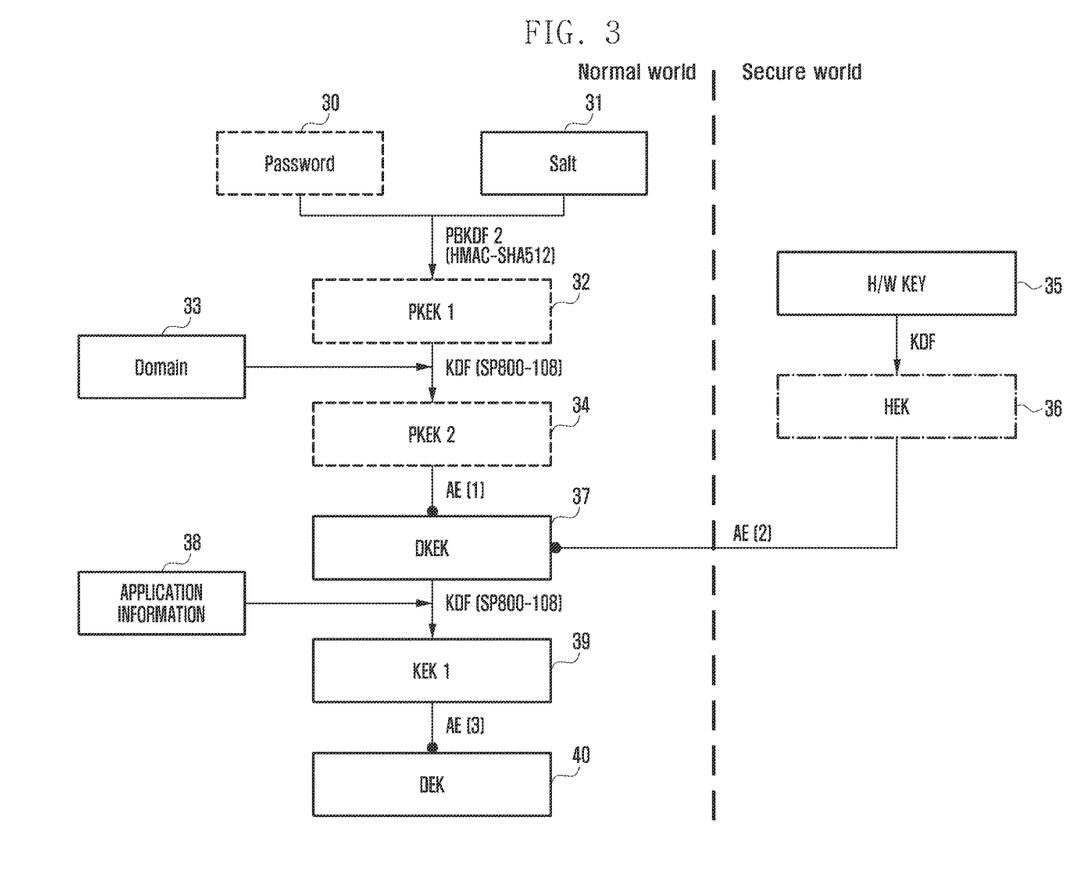
FIG. 3 illustrates a flowchart that describes a key management method according to various embodiments of the present disclosure.

FIG. 3 illustrates a flowchart that describes a key management method according to various embodiments of the present disclosure.

Referring to FIG. 3, the electronic device 200 may include a normal world and a secure world. The normal world refers to a space where an OS (for example, Linux, Android, iOS, and the like) operates and frameworks and applications are also operated under the control of the OS. Since it is difficult to restrict act of malicious software in the normal world, there is always a risk to perform operations requiring a high level of security in the normal world.

The secure world restricts the operation of the existing operation systems and the operation of the existing frameworks and is separated from the normal world. Therefore, the secure world can prevent security-related problems caused by malicious software from occurring. The secure world may allow for use of an SoC and a variety of hardware resources.

In the embodiment of the present disclosure, rectangle blocks drawn with a dashed-line refer to processes (operations) of creation and deletion, without storage, in screen lock, rectangle blocks drawn with a sold line refer to processes (operations) of creation and protection (for example, a storage in a non-volatile mode), and rectangle blocks drawn with a long and short dashed-line refer to processes (operations) of creation and non-deletion in screen lock.

In the embodiment of the present disclosure, a rectangle block connected to other block with a line with an arrow (→) refers to a process (operation) of derivation using a function, and a rectangle block connected to other with a line with a dot (●) at the end refers to a process (operation) of encryption.

The electronic device 200 receives a password entered by the user in the normal world at operation 30. The password that the user has entered in the normal world may be created and then deleted, without being stored, in the screen lock.

The electronic device 200 may randomly create a salt in the normal world at operation 31. A salt is random data that is used as an additional input to one-way function that hashes a password. A salt randomly created in the normal world may be created and then protected.

The electronic device 200 creates Password-derived Key Encryption Key 1 (PKEK1) using function 1, based on the password and the salt, in the normal world at operation 32. Function 1 is Password Based Key Derivation Functions 2 (PBKDF2), which may be an algorithm, HAMC-SHA512. The created PKEK1 may be created and then deleted, without being stored, in the screen lock.

The electronic device 200 creates domain information in the normal world at operation 33. The domain information may be information about a user's default value, security information about a personal domain or company domain, and the like. The created domain information may be created and then protected.

The electronic device 200 creates Password-derived Key Encryption Key 2 (PKEK2) using function 2, based on the domain information and the PKEK1, in the normal world at operation 34. When PKEK2 is created, domain information may be used as label information. Function 2 is Key Derivation Functions (KDF), which may be an algorithm, SP800-108. The created PKEK2 may be created and then deleted, without being stored, in the screen lock.

The electronic device 200 may read a hardware key 211 included in the AP 210 in the secure world at operation 35. The AP 210 may include the hardware key 211 in a memory space. The hardware key 211 included in the AP 210 may be volatile or non-volatile. When the hardware key 211 is non-volatile, the hardware key 211 may be a value fused into the AP 210. When the hardware key 211 is volatile, the hardware key 211 may be a value based on various information items (for example, time information) that may be altered each time the electronic device 200 is turned on.

The electronic device 200 creates Hardware Key Encryption Key (HEK) using function 3, based on the hardware key, in the secure world at operation 36. Function 3 may be an algorithm, KDF. The created HEK may be created and not deleted in the screen lock.

The electronic device 200 encrypts Domain Key Encryption Key (DKEK) randomly created, by using PKEK2 as a key of Authenticated Encryption (AE) algorithm, i.e., a process of AE (1), and then the encrypted DKEK by using HEK as a key of AE algorithm, i.e., a process of AE (2), in the normal world at operation 37. For example, the AE algorithm may be a method using an operation mode, such as Galois/Counter Mode (GCM), Counter with Cipher Block Chaining Message Authentication Code (CBC-MAC) (CCM), and the like, based on a symmetric-key algorithm, or a method using Message Authentication Code (MAC) or Hash-based MAC (HMAC), along with a symmetric-key algorithm. The encrypted DKEK may serve as a Master Key Encryption Key for the electronic device 200. The encrypted DKEK may be created and then protected. The encrypted DKEK may be created and then stored in a non-volatile area of the electronic device 200.

The electronic device 200 may create Application Information in the normal world at operation 38. For example, Application Information may be Application UID. Application Information may be created and then protected. An application UID is a unique application identification number used for identifying applications. The application UID may be an N-bit number which is used for maintaining application installation, security checking, and indicate the ownership of certain files.

The electronic device 200 creates Key Encryption Key 1 (KEK1) using function 2, based on Application Information and DKEK, in the normal world at operation 39. When KEK1 is created, Application Information may be used as label information. The KEK1 may be created and then deleted, without being stored, in the screen lock.

The electronic device 200 encrypts Data Encryption Key (DEK) randomly created, by using KEK1 as a key of AE algorithm, in the normal world at operation 40. The encrypted DEK may be created and then protected. The electronic device 200 may use the encrypted DEK to encrypt or decrypt data.

Figure 4:
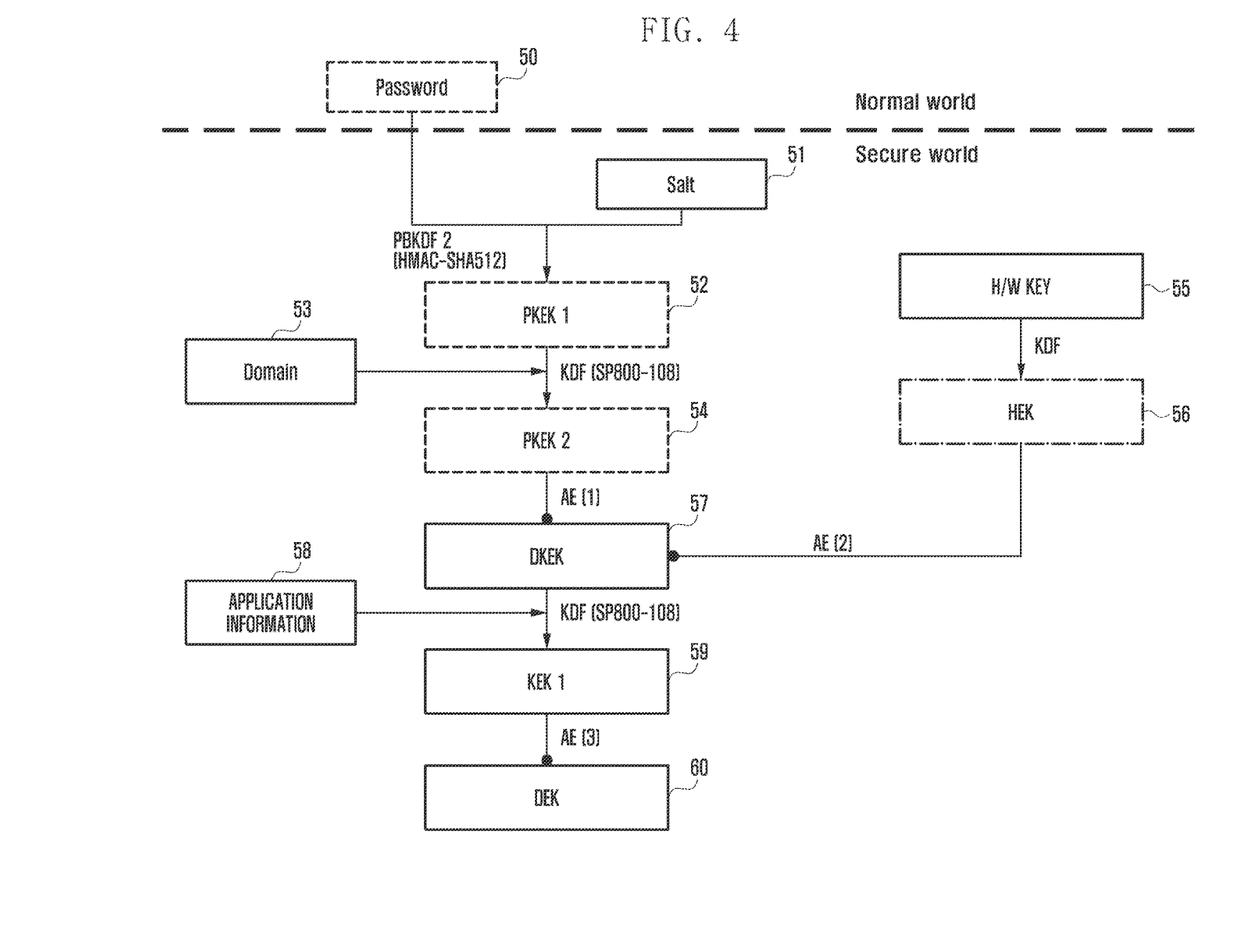
FIG. 4 illustrates a flowchart that describes a key management method according to various embodiments of the present disclosure.

FIG. 4 illustrates a flowchart that describes a key management method according to various embodiments of the present disclosure.

Referring to FIG. 4, the electronic device 200 may include a normal world and a secure world. The normal world refers to a space where an OS (for example, Linux, Android, iOS, and the like) operates and frameworks and applications are also operated under the control of the OS. Since it is difficult to restrict act of malicious software in the normal world, there is always a risk to perform operations requiring a high level of security in the normal world.

The secure world restricts the operation of the existing operation systems and the operation of the existing frameworks and is separated from the normal world. Therefore, the secure world can prevent security-related problems caused by malicious software from occurring. The secure world may allow for use of an SoC and a variety of hardware resources.

In the embodiment of the present disclosure, rectangle blocks drawn with a dashed-line refer to processes (operations) of creation and deletion, without storage, in screen lock, rectangle blocks drawn with a sold line refer to processes (operations) of creation and protection (for example, a storage in a non-volatile mode), and rectangle blocks drawn with a long and short dashed-line refer to processes (operations) of creation and non-deletion in screen lock.

In the embodiment of the present disclosure, a rectangle block connected to other block with a line with an arrow (→) refers to a process (operation) of derivation using a function, and a rectangle block connected to other with a line with a dot (●) at the end refers to a process (operation) of encryption.

The electronic device 200 receives a password entered by the user in the normal world at operation 50. The password that the user has entered in the normal world may be created and then deleted, without being stored, in the screen lock.

The electronic device 200 may randomly create a salt in the secure world at operation 51. A salt is random data that is used as an additional input to one-way function that hashes a password. A salt randomly created in the normal world may be created and then protected.

The electronic device 200 creates PKEK1 using function 1, based on the password and the salt, in the secure world at operation 52. Function 1 is Password-Based Key Derivation Functions 2 (PBKDF2), which may be an algorithm, HAMC-SHA512. The created PKEK1 may be created and then deleted, without being stored, in the screen lock.

The electronic device 200 creates domain information in the secure world at operation 53. The domain information may be information about a user's default value, security information about a personal domain or company domain, and the like. The created domain information may be created and then protected.

The electronic device 200 creates PKEK2 using function 2, based on the domain information and the PKEK1, in the secure world at operation 54. When PKEK2 is created, domain information may be used as label information. Function 2 is KDF, which may be an algorithm, SP800-108. The created PKEK2 may be created and then deleted, without being stored, in the screen lock.

The electronic device 200 may read a hardware key 211 included in the AP 210 in the secure world at operation 55. The AP 210 may include the hardware key 211 in a memory space. The hardware key 211 included in the AP 210 may be volatile or non-volatile. When the hardware key 211 is non-volatile, the hardware key 211 may be information fused into the AP 210. When the hardware key 211 is volatile, the hardware key 211 may be information based on various information items (for example, time information) that may be altered each time the electronic device 200 is turned on.

The electronic device 200 creates HEK using function 3, based on the hardware key, in the secure world at operation 56. Function 3 may be an algorithm, KDF. The created HEK may be created and not deleted in the screen lock.

The electronic device 200 encrypts DKEK randomly created, by using PKEK2 as a key of AE algorithm, i.e., a process of AE (1), and then the encrypted DKEK by using HEK as a key of AE algorithm, i.e., a process of AE (2), in the normal world at operation 57. For example, the AE algorithm may be a method using an operation mode, such as GCM, CCM, and the like, based on a symmetric-key algorithm, or a method using MAC or HMAC, along with a symmetric-key algorithm. The encrypted DKEK may serve as a Master Key Encryption Key for the electronic device 200. The encrypted DKEK may be created and then protected. The encrypted DKEK may be created and then stored in a non-volatile area of the electronic device 200.

The electronic device 200 may create Application Information in the secure world at operation 58. For example, Application Information may be Application UID. Application Information may be created and then protected.

The electronic device 200 creates KEK1 using function 2, based on Application Information and DKEK, in the secure world at operation 59. When KEK1 is created, Application Information may be used as label information. The KEK1 may be created and then deleted, without being stored, in the screen lock.

The electronic device 200 encrypts DEK randomly created, by using KEK1 as a key of AE algorithm, in the secure world at operation 60. The encrypted DEK may be created and then protected. The electronic device 200 may use the encrypted DEK to encrypt or decrypt data.

Figure 5:
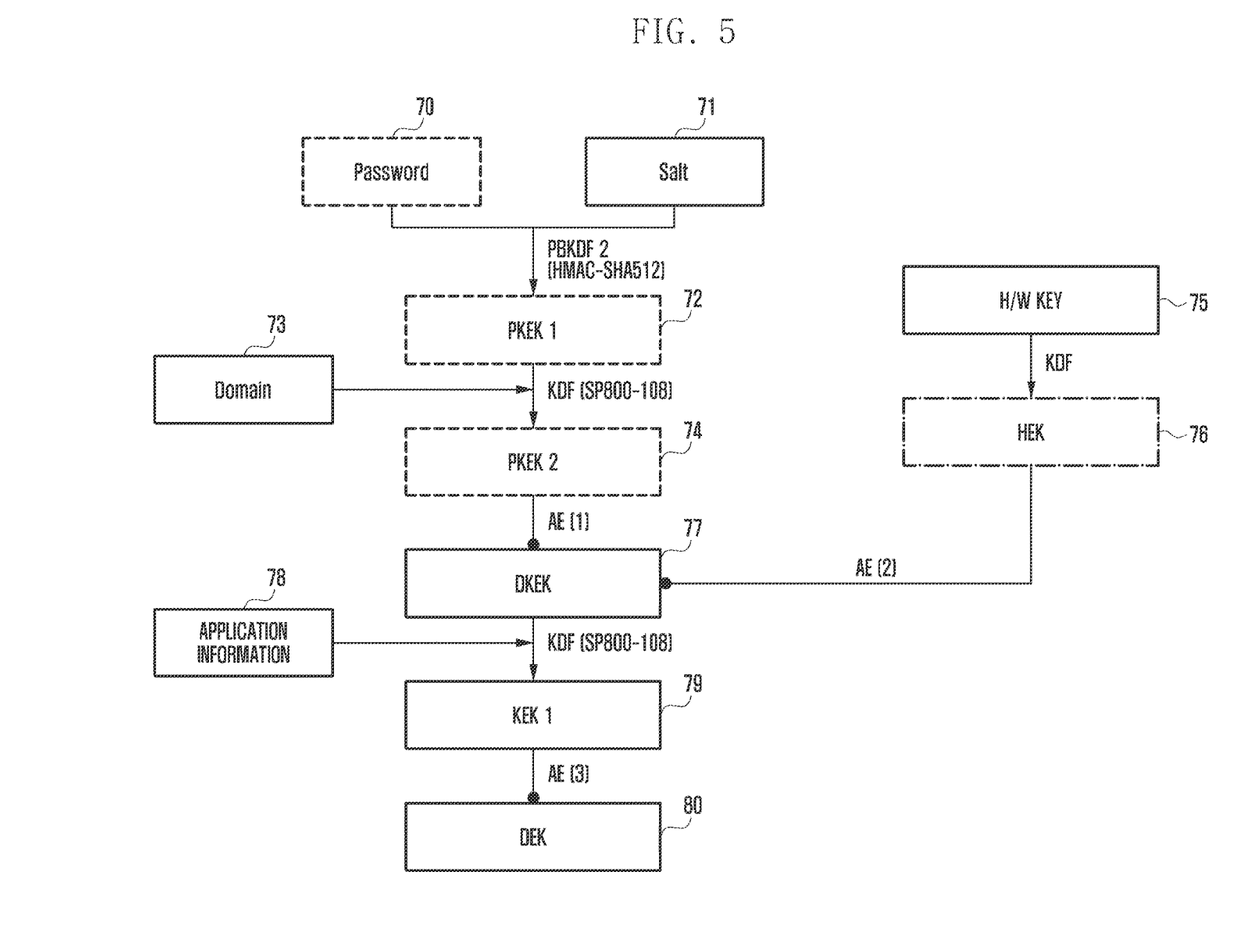
FIG. 5 illustrates a flowchart that describes a key management method according to various embodiments of the present disclosure.

FIG. 5 illustrates a flowchart that describes a key management method according to various embodiments of the present disclosure.

Referring to FIG. 5, in the embodiment of the present disclosure, rectangle blocks drawn with a dashed-line refer to processes (operations) of creation and deletion, without storage, in screen lock, rectangle blocks drawn with a sold line refer to processes (operations) of creation and protection (for example, a storage in a non-volatile mode), and rectangle blocks drawn with a long and short dashed-line refer to processes (operations) of creation and non-deletion in screen lock.

In the embodiment of the present disclosure, a rectangle block connected to other block with a line with an arrow (→) refers to a process (operation) of derivation using a function, and a rectangle block connected to other with a line with a dot (●) at the end refers to a process (operation) of encryption.

The electronic device 200 receives a password entered by the user at operation 70. The password that the user has entered may be created and then deleted, without being stored, in the screen lock.

The electronic device 200 may randomly create a salt at operation 71. A salt is random data that is used as an additional input to one-way function that hashes a password. The randomly created salt may be created and then protected.

The electronic device 200 creates PKEK1 using function 1, based on the password and the salt at operation 72. Function 1 is PBKDF2, which may be an algorithm, HAMC-SHA512. The created PKEK1 may be created and then deleted, without being stored, in the screen lock.

The electronic device 200 creates domain information at operation 73. The domain information may be information about a user's default value, security information about a personal domain or company domain, and the like. The created domain information may be created and then protected.

The electronic device 200 creates PKEK2 using function 2, based on the domain information and the PKEK1 at operation 74. When PKEK2 is created, domain information may be used as label information. Function 2 is KDF, which may be an algorithm, SP800-108. The created PKEK2 may be created and then deleted, without being stored, in the screen lock.

The electronic device 200 may read a hardware key 211 included in the AP 210 at operation 75. The AP 210 may include the hardware key 211 in a memory space. The hardware key 211 included in the AP 210 may be volatile or non-volatile. When the hardware key 211 is non-volatile, the hardware key 211 may be information fused into the AP 210. When the hardware key 211 is volatile, the hardware key 211 may be information based on various information items (for example, time information) that may be altered each time the electronic device 200 is turned on.

The electronic device 200 creates HEK using function 3, based on the hardware key at operation 76. Function 3 may be an algorithm, KDF. The created HEK may be created and not deleted in the screen lock.

The electronic device 200 encrypts DKEK randomly created, by using PKEK2 as a key of AE algorithm, i.e., a process of AE (1), and then the encrypted DKEK by using HEK as a key of AE algorithm, i.e., a process of AE (2) at operation 77. For example, the AE algorithm may be a method using an operation mode, such as GCM, CCM, and the like, based on a symmetric-key algorithm, or a method using MAC or HMAC, along with a symmetric-key algorithm. The encrypted DKEK may serve as a Master Key Encryption Key for the electronic device 200. The encrypted DKEK may be created and then protected. The encrypted DKEK may be created and then stored in a non-volatile area of the electronic device 200.

The electronic device 200 may create Application Information at operation 78. For example, Application Information may be Application UID. Application Information may be created and then protected.

The electronic device 200 creates KEK1 using function 2, based on Application Information and DKEK at operation 79. When KEK1 is created, Application Information may be used as label information. The KEK1 may be created and then deleted, without being stored, in the screen lock.

The electronic device 200 encrypts DEK randomly created, by using KEK1 as a key of AE algorithm at operation 80. The encrypted DEK may be created and then protected. The electronic device 200 may use the encrypted DEK to encrypt or decrypt data.

Figure 6:
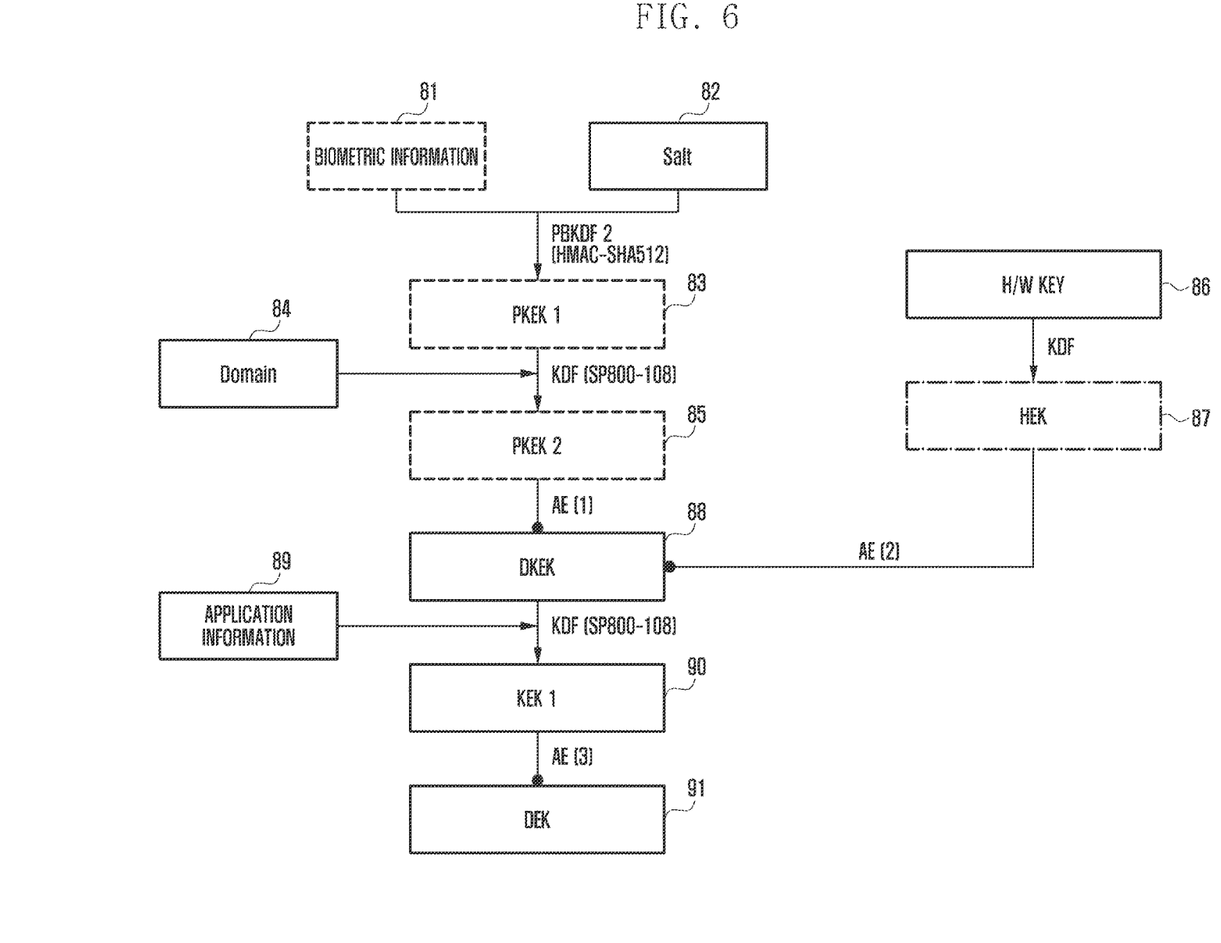
FIG. 6 illustrates a flowchart that describes a key management method according to various embodiments of the present disclosure.

FIG. 6 illustrates a flowchart that describes a key management method according to various embodiments of the present disclosure.

Referring to FIG. 6, in the embodiment of the present disclosure, rectangle blocks drawn with a dashed-line refer to processes (operations) of creation and deletion, without storage, in screen lock, rectangle blocks drawn with a sold line refer to processes (operations) of creation and protection (for example, a storage in a non-volatile mode), and rectangle blocks drawn with a long and short dashed-line refer to processes (operations) of creation and non-deletion in screen lock.

In the embodiment of the present disclosure, a rectangle block connected to other block with a line with an arrow (→) refers to a process (operation) of derivation using a function, and a rectangle block connected to other with a line with a dot (●) at the end refers to a process (operation) of encryption.

The electronic device 200 receives biometric information entered by the user at operation 81. The user's entered biometric information may be created and then deleted, without being stored, in the screen lock. In an embodiment of the present disclosure, the biometric information may be one of a user's fingerprint, iris, and voice.

The electronic device 200 may randomly create a salt at operation 82. A salt is random data that is used as an additional input to one-way function that hashes biometric information. The randomly created salt may be created and then protected.

The electronic device 200 creates PKEK1 using function 1, based on the biometric information and the salt at operation 83. Function 1 is PBKDF2, which may be an algorithm, HAMC-SHA512. The electronic device 200 creates PKEK1 using PBKDF2 (HAMC-SHA512), based on password and the salt in operation 83. The PKEK1 created based on password and salt using function 1 may be created and then deleted, without being stored, in the screen lock.

The electronic device 200 creates domain information at operation 84. The domain information may be information about a user's default value, security information about a personal domain or company domain, and the like. The created domain information may be created and then protected.

The electronic device 200 creates PKEK2 using function 2, based on the domain information and the PKEK1 at operation 85. When PKEK2 is created, domain information may be used as label information. Function 2 is KDF, which may be an algorithm, SP800-108. The created PKEK2 may be created and then deleted, without being stored, in the screen lock.

The electronic device 200 may read a hardware key 211 included in the AP 210 at operation 86. The AP 210 may include the hardware key 211 in a memory space. The hardware key 211 included in the AP 210 may be volatile or non-volatile. When the hardware key 211 is non-volatile, the hardware key 211 may be information fused into the AP 210. When the hardware key 211 is volatile, the hardware key 211 may be information based on various information items (for example, time information) that may be altered each time the electronic device 200 is turned on.

The electronic device 200 creates HEK using function 3, based on the hardware key at operation 87. Function 3 may be an algorithm, KDF. The created HEK may be created and not deleted in the screen lock.

The electronic device 200 encrypts DKEK randomly created, by using PKEK2 as a key of AE algorithm, i.e., a process of AE (1), and then the encrypted DKEK by using HEK as a key of AE algorithm, i.e., a process of AE (2) at operation 88. For example, the AE algorithm may be a method using an operation mode, such as GCM, CCM, and the like, based on a symmetric-key algorithm, or a method using MAC or HMAC, along with a symmetric-key algorithm. The encrypted DKEK may serve as a Master Key Encryption Key for the electronic device 200. The encrypted DKEK may be created and then protected. The encrypted DKEK may be created and then stored in a non-volatile area of the electronic device 200.

The electronic device 200 may create Application Information at operation 89. For example, Application Information may be Application UID. Application Information may be created and then protected.

The electronic device 200 creates KEK1 using function 2, based on Application Information and DKEK at operation 90. When KEK1 is created, Application Information may be used as label information. The KEK1 may be created and then deleted, without being stored, in the screen lock.

The electronic device 200 encrypts DEK randomly created, by using KEK1 as a key of AE algorithm at operation 91. The encrypted DEK may be created and then protected. The electronic device 200 may use the encrypted DEK to encrypt or decrypt data.

As described above, the key management method and the electronic device adapted to the method can create keys by a hardware key, application information and domain information as well as a user's password, thereby enhancing the information protection function of the electronic device.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of managing keys of an electronic device, the method comprising:
   creating a hardware key encryption key (HEK) based on a hardware key used into the processor in a secure world;
   creating a password-derived key encryption key (PKEK) based on a password, salt, and domain information in a normal world;
   encrypting a domain key encryption key (DKEK) randomly created based on the PKEK as a key of an authenticated encryption (AE) algorithm, and the encrypted DKEK based on the HEK as the key of the AE algorithm in the normal world; and
   encrypting a data encryption key (DEK) randomly created based on the encrypted DKEK and application information in the normal world.

2. The method of claim 1, wherein the creating of the HEK comprises:
   creating the HEK based on key derivation functions (KDF), based on the hardware key.

3. The method of claim 1, wherein the creating of the PKEK comprises: creating a password-derived key encryption key 1 (PKEK1) based on a function 1, based on the salt and the password; and creating a password-derived key encryption key 2 (PKEK2) based on a function 2, based on the PKEK1 and the domain information used as label information.

4. The method of claim 3, wherein the function 1 comprises:
   a password based key derivation functions 2 (PBKDF2), where the PBKDF2 comprises an HAMC-SHA512 algorithm.

5. The method of claim 3, wherein the function 2 comprises:
   key derivation functions (KDF), where the KDF comprises an SP800-108 algorithm.

6. The method of claim 3, wherein the domain information comprises:
   information about a user's default value or security information about a personal domain or company domain.

7. The method of claim 1, wherein the AE algorithm comprises:
   a process using an operation mode based on a symmetric-key algorithm; or
   a process using message authentication code (MAC) or hash-based MAC (HMAC), along with a symmetric-key algorithm,
   wherein the operation mode comprises at least one of galois/counter mode (GCM) and counter with cipher block chaining message authentication code (CBC-MAC)(CCM).

8. The method of claim 1, wherein the application information comprises:
   an application UID.

9. A method of managing keys of an electronic device, the method comprising:
   receiving a password that a user enters in a normal world;
   creating a hardware key encryption key (HEK) based on a hardware key used into the processor in a secure world;
   creating a password-derived key encryption key (PKEK) based on the password, salt, and domain information in the secure world;
   encrypting a domain key encryption key (DKEK) randomly created based on the PKEK as a key of an authenticated encryption (AE) algorithm, and the encrypted DKEK based on the HEK as the key of the AE algorithm in the secure world; and
   encrypting a data encryption key (DEK) randomly created, based on the encrypted DKEK and application information in the secure world.

10. The method of claim 9, wherein the creating of the HEK comprises:
    creating the HEK based on KDF, based on the hardware key.

11. The method of claim 9, wherein the creating of the PKEK comprises: creating a password-derived key encryption key 1 (PKEK1) based on function 1, based on the salt and the password; and creating a password-derived key encryption key 2 (PKEK2) based on function 2, based on the PKEK1 and the domain information used as label information.

12. The method of claim 11, wherein the function 1 comprises:

a password based Key derivation functions 2 (PBKDF2), where the PBKDF2 comprises an HAMC-SHA512 algorithm.

13. The method of claim 11, wherein the function 2 comprises:
    key derivation functions (KDF), where the KDF comprises an SP800-108 algorithm.

14. The method of claim 11, wherein the domain information comprises:
    information about a user's default value or security information about a personal domain or company domain.

15. The method of claim 9, wherein the AE algorithm comprises:
    a process using an operation mode based on a symmetric-key algorithm; or
    a process using MAC or HMAC, along with a symmetric-key algorithm,
    wherein the operation mode comprises at least one of galois/counter mode (GCM) and counter with cipher block chaining message authentication code (CBC-MAC)(CCM).

16. The method of claim 9, wherein the application information comprises:
    an application UID.

17. An electronic device comprising:
    a memory; and
    a processor coupled to the memory,
    wherein the processor is configured to:
       create a hardware key encryption key (HEK) based on a hardware key used into the processor in a secure world;
       create a password-derived key encryption key (PKEK) based on a password, salt, and domain information in a normal world;
       encrypt a domain key encryption key (DKEK) randomly created based on the PKEK as a key of authenticated encryption (AE) algorithm, and the encrypted DKEK based on the HEK as the key of AE algorithm in the normal world; and
       encrypt a data encryption key (DEK) randomly created, based on the encrypted DKEK and application information in the normal world.

18. The electronic device of claim 17, wherein the processor is further configured to create the HEK based on key derivation functions (KDF), based on the hardware key.

19. The electronic device of claim 18, wherein the processor is further configured to: to create a password-derived key encryption key 1 (PKEK1) based on function 1, based on the salt and the password; and to create a password-derived key encryption key 2 (PKEK2) based on function 2, based on the PKEK1 and the domain information used as label information.

20. The electronic device of claim 19,
    wherein the function 1 comprises password based key derivation functions 2 (PBKDF2), where the PBKDF2 is an HAMC-SHA512 algorithm;
    the function 2 comprises KDF, where the KDF is an SP800-108 algorithm;
    the domain information comprises information about a user's default value or security information about a personal domain or company domain; and
    the AE algorithm comprises a process using an operation mode based on a symmetric-key algorithm or a process using message authentication code (MAC) or hash-based MAC (HMAC), along with a symmetric-key algorithm; and the application information comprises Application UID, and
    wherein the operation mode comprises at least one of galois/counter mode (GCM) and counter with cipher block chaining message authentication code (CBC-MAC)(CCM).

* * * * *